United States Patent [19]

Wilson

[11] 3,851,359
[45] Dec. 3, 1974

[54] DISPOSABLE SAFETY PIN

[76] Inventor: Leroy Wilson, P.O. Box 203, Manhattan, Kans. 66502

[22] Filed: May 2, 1973

[21] Appl. No.: 356,371

[52] U.S. Cl............................ 24/156 R, 24/150 SP
[51] Int. Cl................................................ A44b 9/18
[58] Field of Search........... 24/156 R, 156 P, 157 P, 24/157 PP, 157 F, 157 PS, 155 SP, 155 D, 150 SP, 161 R; 292/322

[56] References Cited
UNITED STATES PATENTS

| | | | |
|---|---|---|---|
| 1,192,522 | 7/1916 | Hunsberger | 24/156 R |
| 1,237,034 | 8/1917 | Harris | 292/322 |
| 2,045,666 | 6/1936 | McPhee | 24/156 R |
| 3,600,027 | 8/1971 | Noland et al. | 292/322 |
| 3,735,453 | 5/1973 | Nathans | 24/156 R |

Primary Examiner—Jordan Franklin
Assistant Examiner—Kenneth J. Dorner
Attorney, Agent, or Firm—Lowe, Kokjer, Kircher, Wharton & Bowman

[57] ABSTRACT

A safety pin construction which, once fastened, can not be reopened. The head of the pin includes an interior chamber having a one-way access flap for inserting the point of the shank in closing the pin. Both legs of the pin shank have frangible portions for severing the head of the pin from the shank and the interior chamber is so sized as to capture the point when the head is broken away from the shank.

1 Claim, 9 Drawing Figures

PATENTED DEC 3 1974

3,851,359

3,851,359

DISPOSABLE SAFETY PIN

BACKGROUND AND SUMMARY OF THE INVENTION

This invention relates to an improved safety pin of the type normally used for fastening to fabrics and clothing. Particularly widespread use of fasteners of this genre is found in conjunction with garments for infants, such as securing diapers on babies.

The point of the pin, sharpened in order to pierce the fabric layer, represents a substantial danger which has, at times, resulted in grievous injuries to youngsters when the pin is opened after having once been fastened. Such may occur when the child opens the pin through curiosity or accidentally when the clothing is twisted or pulled or the shank of the pin is otherwise dislodged from the head.

Since experience has shown that the term "safety" pin is often anomalous, particularly where infants are concerned, there is a need in this art for a safety pin of a truly safe nature. The primary goal of this invention is to meet this need.

More specifically, an object of this invention is to provide a safety pin of such a construction as to substantially eliminate the risk of injury represented by the point of the pin.

Another object of the invention is to provide a safety pin which, once fastened, cannot be reopened to expose the point of the pin. By means of a one way clasping element, once the pin is closed, it may not be reopened either intentionally or through accident by becoming entangled in the fabric during movement thereof.

An additional object of the invention is to provide a safety pin of the foregoing character, being both inexpensive and disposable. Once fastened, as for example in fabric, the pin may be removed by breaking the head away from the shank and then withdrawing the shank from the fabric. The point of the pin is retained in the head when the head is broken away, thus eliminating the threat of injuries.

Other and further objects of the invention, together with the features of novelty appurtenant thereto, will appear in the course of the following description.

DESCRIPTION OF THE DRAWINGS

In the accompanying drawing, which forms a part of the specification and is to be read in conjunction therewith, and in which like reference numerals are employed to indicate like parts in the various views.

Figure 1:
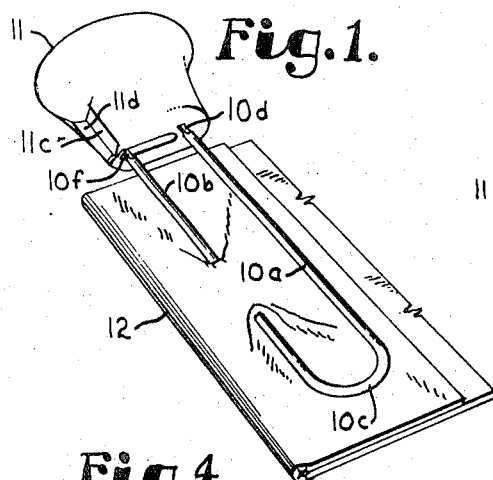
FIG. 1 is a perspective view of a safety pin constructed in accordance with a preferred embodiment of the invention and shown in the closed position after having been inserted through fabric.
Figure 8:
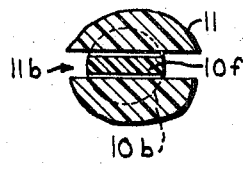
FIG. 8 is an enlarged fragmentary view illustrating the relationship between the shank and the receiving slot in the head.

Referring to the drawings in more detail, the safety pin basically includes a shank 10 and a head 11 fabricated from plastic or similar synthetic material of a resiliently deformable nature. By way of example, such material may typically include polyethylenes, acetals, chlorinated polyethers, polypropylenes, polystyrenes and other compositions of like qualities possessing a measure of resiliency.

Figure 3:
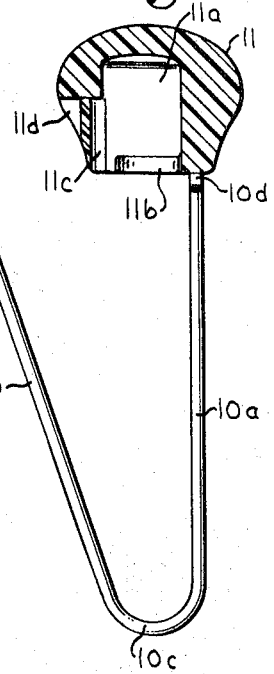
FIG. 3 is a side elevational view, partly sectional, taken along line 3—3 of FIG. 2 in the direction of the arrows, with the pin shown in the open position.

As shown in FIG. 3, the shank 10 comprises leg portions 10a and 10b of approximately equal lenghts integrally connected at the lower ends thereof by a transition bend 10c to provide a continuous or U-shaped element of substantially uniform cross section. The springy nature of the material of construction enables displacement of the leg 10b toward the leg 10a. The upper end of leg 10a is integrally joined to the bottom of the head by a frangible portion 10d. Within the plane of the shank 10 (i.e., the plane containing the longitudinal axis of leg portion 10a and 10b and transition bend 10c), the frangible portion 10d is equivalent in lateral dimension to the leg 10a. However, in the direction normal to the plane of the shank 10, the frangible portion 10d is reduced in dimension to provide a weakened line of severance lying in the plane of the shank 10 and being substantially perpendicular to the axis of the leg 10a.

Figure 4:
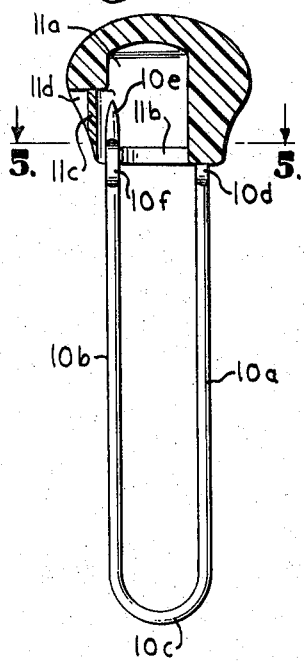
FIG. 4 is a side elevational view, partly sectional, like that of FIG. 3, but with the pin shown in the closed or fastened position.
Figure 2:
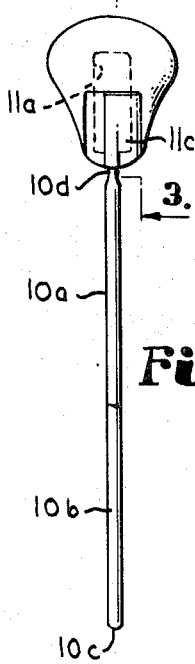
FIG. 2 is a front elevational view of the safety pin.

The upper end of the leg 10b is integrally connected to a tapered point 10e by a necked portion 10f. The lowermost part of the point 10e is substantially the same size as the leg 10b and tapers to the uppermost part to a sharpened pin point adapted to pierce fabric 12. The necked portion 10f is a frangible section which, in the plane of the shank 10, is equivalent in lateral dimention to the leg 10b. However, in the direction normal to the plane of the shank 10, the necked portion 10f is reduced in dimension to provide a weakened line of severance lying in the plane of the shank 10 and being substantially perpendicular to the axis of the leg 10a. Thus, the frangible portion 10d and the necked portion 10f are of similar dimension and have a substantially coincident line of severance when the safety pin is in the fastened position as shown in FIG. 4.

Figure 7:
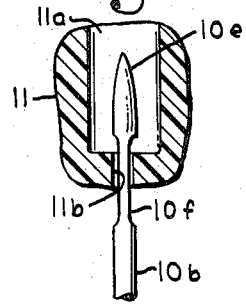
FIG. 7 is an enlarged, front fragmentary view illustrating the point of the pin received with the head in the fastened position.

The head 11 of the safety pin may be of any conventional exterior shape, such as the bulbous contour illustrated in the drawing, and contains a hollow, interior cavity 11a of sufficient dimensions to receive the tapered point 10e of the shank. Along the bottom of the head 11, an elongate slot 11b contiguous with the cavity 11a extends from the front of the head 11 and terminates slightly ahead of the frangible portion 10d. In width, the slot 11b (as shown in FIG. 7) is smaller in dimension than the largest width of the tapered point 10e and is slightly larger than the reduced dimension of the hecked portion 10f. In other words, the slot 11b is of sufficient width to admit the neck 10f but is not of sufficient width to admit the point 10e.

Vertical access to the interior cavity 11a is provided in the front of the head 11 by an elongate opening which is normally closed by an inwardly directed, resiliently deformable flap 11c formed in one wall of the head 11. The outer edge of the flap 11c is normally biased to engagement with an elongate ridge 11d or similar protrusion formed in the opposite wall of the head 11. Thus the flap 11c provides a one-way access door to the cavity 11a and is adapted to swing inwardly to the cavity 11a but, being blocked by the ridge 11d, is prevented from folding outwardly from the head 11.

In height, the flap 11c extends vertically a sufficient distance to accommodate the length of the tapered point 11e and the flap 11c can be resiliently displaced from the ridge 11d a sufficient distance to admit the largest dimension of the tapered point 11e.

Figure 5:
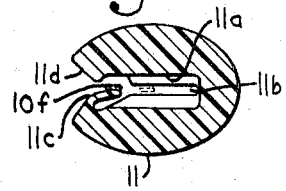
FIG. 5 is a sectional view through the head of the pin taken along line 5—5 of FIG. 4 in the direction of the arrows, illustrating the position of the shank during the fastening thereof.
Figure 6:
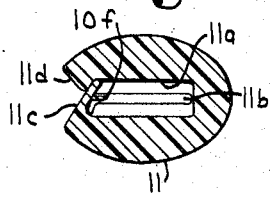
FIG. 6 is a sectional view, similar to FIG. 5, showing the position of the shank in the closed position.

In operation, the safety pin constructed in accordance with the principles of this invention may be utilized in the following manner. In the open position (FIG. 3), the safety pin is employed by piercing one or more layers of fabric 12 with the point 10e and passing the point 10e through the fabric 12 until the fabric is received on the leg 10b of the shank. The leg 10b is then urged toward the leg 10a until the point 10e and neck 10f portions engage the flap 11c. Further urging of the leg 10b toward the head 11 causes the flap 11c to yieldingly swing into the cavity (FIG. 5, first position shown for element 10f), thus admitting the point 10e and neck 10f. When the shank passes the flap 11c (FIG. 5, second position shown for element 10f), the flap 11c returns to engagement with the ridge element 11d and, once released, the shank engages the back side of the flap 11c within the cavity 11a (FIG. 6). Thus, the safety pin is fastened (FIGS. 1 and 4) and cannot be reopened.

Figure 9:
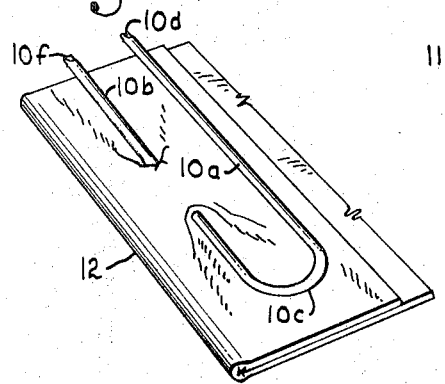
FIG. 9 is a perspective view, similar to FIG. 1 showing the head of the pin broken away from the shank in order to remove the shank from the fabric.

In order to remove the safety pin from the fabric 12, force is applied to the head 11 in a direction substantially normal to the plane of the shank 10 which causes the shank to break at the weakened lines of severance in portions 10d and 10f. With the head 11 broken away from the shank 10 (FIG. 9), the shank may easily be removed from the fabric 12.

In connection with the frangible sections 10d and 10f of the shank, it should be noted that such portions are so contoured as shown and described as to resist fracture when the leg 10b is displaced toward leg 10a during the fastening of the safety pin (i.e., forces acting on the frangible sections in the same plane as the shank), yet as to facilitate fracture when the head 11 is displaced sideways (i.e., forces acting on the frangible sections substantially normal to the plane of the shank).

Once the safety pin has been closed, the point 10e is permanently captured within the interior cavity 11a and cannot be removed since the flap 11c provides access to the cavity in only one direction. Likewise, even when the head 11 is broken away from the shank 10, the point 10e remains within the cavity 11a since the slot 11b is narrower than the dimension of the point 10e, thus rendering escape impossible.

From the foregoing it will be understood that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth, or shown in the accompanying drawing is to be interpreted as illustrative and not in a limiting sense.

Having thus described my invention, I claim:

1. A disposable safety pin which, having once been fastened, cannot be reopened, said safety pin comprising:

an arcuately bowed shank having first and second leg portions integrally connected at the lower ends thereof by a resiliently flexible portion;

a first frangible portion integrally joined to the upper end of said first leg portion and having a larger dimension lying in the plane of said shank and having a reduced dimension substantially normal to the plane of said shank to provide a first weakened line of severance within the plane of said shank;

a second frangible portion integrally joined to the upper end of said second leg portion and having a larger dimension lying in the plane of said shank and having a reduced dimension substantially normal to the plane of said shank to provide a second weakened line of severance within the plane of said shank;

a fabric piercing point portion integrally joined to said second frangible portion and having a greater dimension from which said portion tapers to a sharp point;

a safety pin head element integrally connected to said first frangible portion; and capture means associated with said head for permanently retaining the point of said shank when the safety pin has been fastened, said capture means including:

an interior chamber within said head and of sufficient dimensions to receive said point portion;

an elongate opening disposed in the bottom of said head and adjoining said interior chamber, said opening being slightly greater in width than said reduced dimension of said second frangible portion and being smaller in width than said greater dimension of said point portion and thereby adapted to receive said second frangible portion for reciprocal movement therein; and a resiliently flexible closure member associated with said head and communicating with said interior chamber to admit said point portion to said chamber and said second frangible portion to said opening, but to prevent removal of said point portion from said chamber;

whereby, once the safety pin is fastened with the point portion captured within said interior chamber, removal of the safety pin may be accomplished by fracture of the first and second frangible portions in order to separate said head element from said shank.

* * * * *